United States Patent [19]

Grimm

[11] 4,367,427

[45] Jan. 4, 1983

[54] GLOW DISCHARGE LAMP FOR QUALITATIVE AND QUANTITATIVE SPECTRUM ANALYSIS

[75] Inventor: Werner Grimm, Hanau, Fed. Rep. of Germany

[73] Assignee: Vacuumschmelze GmbH, Hanau, Fed. Rep. of Germany

[21] Appl. No.: 124,716

[22] Filed: Feb. 26, 1980

[30] Foreign Application Priority Data

Mar. 3, 1979 [DE] Fed. Rep. of Germany ....... 2908350

[51] Int. Cl.³ ............................................... G01J 3/12
[52] U.S. Cl. ................................ 313/210; 313/231.31
[58] Field of Search ............... 313/153, 155, 157, 191, 313/192, 193, 210, 231.3; 356/316

[56] References Cited

U.S. PATENT DOCUMENTS

| 2,978,580 | 4/1961 | von Ardenne | 313/231.3 |
| 3,336,492 | 8/1967 | Baker et al. | 313/192 |
| 3,543,077 | 11/1970 | Grimm. | |
| 3,611,013 | 10/1971 | Gleason et al. | 356/316 |
| 3,626,234 | 12/1971 | Grimm | 313/210 |
| 4,041,353 | 8/1977 | Penfold et al. | 313/153 |

OTHER PUBLICATIONS

R. M. Lowe, A Modified Glow-Discharge Source for Emission Spectroscopy, Revised Nov. 30, 1975, "Spectrochimics Acta," vol. 31B, pp. 257–261 (1976).

Primary Examiner—Bruce C. Anderson
Attorney, Agent, or Firm—Kenyon & Kenyon

[57] ABSTRACT

A glow discharge lamp for qualitative and quantitative spectrum analysis having a discharge chamber closable on the cathode side by an electrically conductive disk at cathodic potential in which, to increase the luminous intensity and the accuracy of the analysis, a ring magnet of permanent magnet material magnetized in axial direction for producing a magnetic field extending substantially in axial direction in the discharge chamber is provided and a control electrode which is insulated from the anode body is provided.

16 Claims, 4 Drawing Figures

GLOW DISCHARGE LAMP FOR QUALITATIVE AND QUANTITATIVE SPECTRUM ANALYSIS

BACKGROUND OF THE INVENTION

This invention relates to a glow discharge lamp for qualitative and quantitative spectrum analysis in general and more particularly to an improved glow discharge lamp of the type having a discharge chamber closable on the cathode side by an electrically conductive disk at cathode potential.

In analyses used, for example, to monitor production or for routine material control, there is a requirement to determine the components of a substance or the concentration thereof quickly and at little expense, with a narrow error range. Often only small amounts of the substance are avaiable.

For such analyses, optical emission spectrum analyses making use of the cathode glow of the substances to be examined has proven especially favorable. Generally a rare gas, preferably argon, is used as the working gas for producing the glow discharge.

A known glow discharge lamp for producing the cathode glow and acting as a light source has an anode body which possesses, on the cathode side, an electrically conductive tubular projection connected with the anode body, and has a disk of electrically conductive material pressed against the side of the cathode body surrounding the tubular projection, away from the anode, the distance between the tubular projection and the practically plane surface of the disk being 0.05 to 0.5 mm. In this glow discharge lamp, the working gas is pumped off through the gap between the tubular projection and the surface of the disk. The disk may itself consist wholly or partly of the substance to be analyzed or, if the latter is liquid, be impregnated with it. Alternatively the substance to be analyzed may be placed on the disk or, if it is gaseous, be admixed to the working gas (U.S. Pat. No. 3,543,077). Further the disk may be provided with one or more bores to receive wire type samples to be analyzed (U.S. Pat. No. 3,626,234).

In the operation of this known glow discharge lamp a cathode glow of high luminous intensity, forms over the disk at cathodic potential, which glow is limited by the bore of the anode tubular projection. The substance to be analyzed, continuously atomized by bombardment with working gas ions or already admixed to the working gas in gaseous form, is excited to emit light in the cathode glow which can, in this state, be detected by spectrum analysis and determined quantitatively.

With increasing luminous intensity, that is, increased excitation of the atoms of the substance to be analyzed, the accuracy of the analysis increases. To achieve such an increased excitation, a high current low voltage discharge has previously been provided in a glow discharge lamp of the known kind, in addition to the glow discharge. Through this additional discharge, the electron density in the discharge chamber and hence the number of collisions of the electrons with the atoms of the substance to be analyzed is increased. Due to this additional discharge, however, the construction of the glow discharge lamp becomes relatively complicated since two additional electrodes are necessary. These are sealed in glass tubes communicating directly at the discharge chamber. (Spectrochimica Acta 31 B (1976), pages 257 to 261). It is also known, in hollow cathode lamps, to divide the cathode into two half-shells which are electrically insulated and held together by a layer of adhesive. The inner cathode half-shell can be designed as a control electrode as seen in Offenlegungsschrift No. 1,905,318, Aug. 6, 1970. However, such a control electrode, because of the discharge conditions due to the hollow shape of the cathode, has little influence on the intensity of the spectral lines.

Furthermore, glow discharge lamps for optical spectrum analysis having a discharge chamber which can be closed off on the cathode side by an electrically conductive disc at cathode potential, have already been proposed in which means for producing a magnetic field extending in the discharge chamber subsantially in the axial direction are provided to increase the light intensity and the accuracy of the analysis. These means may consist, in particular, of a ring magnet of permanent magnet material magnetized in the axial direction as disclosed in my copending Application Ser. No. 032,009, now abandoned. A controllable electromagnet can also be disposed coaxially with this ring magnet as also disclosed in my copending Application Ser. No. 032,009. Through appropriate control of the electromagnet, for instance, to a constant discharge, analysis errors due to differences in the samples can be reduced.

SUMMARY OF THE INVENTION

It is the object of the present invention, in a glow discharge lamp of the above-mentioned kind, to increase the luminous intensity and hence the range of sample which can be detected by the analysis.

According to the present invention, this problem is solved by providing means for producing a magnetic field extending substantially in axial direction in the discharge chamber, and a control electrode which is insulated from the anode body.

By using this magnetic field, the free electrons present in the discharge chamber are forced onto helical paths. Thereby the path of the electrons to the anode is lengthened and their number of collisions with the atoms of the substance to be analyzed present in the plasma of the cathode glow is increased. The additional electric field of the control electrode, to which a potential positive in relation to the rest of the anode body at ground potential can be applied, causes the free electrons to also be drawn in the direction of the superimposed field and to be post-accelerated. Some of the electrons which stem as primary electrons from the cathode or are generated as secondary electrons in the gas discharge plasma, thereby reach the necessery excitation energy and can thus participate in further collision excitation with atoms of the substance to be analyzed present in the gas discharge plasma of the cathode glow. Overall, this leads to a substantially increased production of secondary electons and ions and thereby to an unexpectedly high amplification of the intensity of the spectral lines specific to the elements. Because of their very much greater mass, the ions which bring about the atomization of the cathodic substance are not greatly influenced by the magnetic field. However, due to their acceleration in the electric field of the cathode drop zone, they contribute to an increased material decomposition of the substance to be analyzed, present in or on the electrically conductive disk. This permits, provided the substance to be analyzed is not present in gaseous form, a reduction of the operating pressure from the values of 800 to 1200 Pa customary until now to, for example, 130 to 530 Pa.

One preferred embodiment of the glow discharge lamp, according to the present invention, is designed so that the control electrode is arranged coaxially in the part of the discharge chamber on the anode side. The control electrode is advantageously fastened to a tubular insert on the anode side within the anode body, which serves as an electron mount and is likewise insulated from the anode body. The control electrode can be soldered to the insert or preferably also be screwed into the insert, which facilitates the exchangeability. For heat removal it is advantageous if the insert consists of a highly heat conducting material, for instance, of a copper alloy such as brass or high-conduction bronze and has at least one hole in the wall of the tube of the insert to facilitate pumping off the working gas introduced. Such a hole, especially if it is located on the part of the insert on the cathode side, also prevents the gas discharge plasma from being broken off by convection at the end of the control electrode on the anode side.

It is particularly advantageous if the inside diameter of the tube aperture of the insert increases with increasing distance from the control electrode. An insert shaped in this manner used as the electrode mount makes it possible to feed the working gas into the discharge chamber without turbulence and also has advantages for the light path from the discharge chamber to the spectrometer.

An embodiment of the glow discharge lamp according to the present invention, preferred in particular because of its simple construction, is therefore designed so that the anode body contains a ring magnet of permanent magnet material surrounding the discharge chamber and magnetized in axial direction.

Preferably one uses a ring magnet of cobalt-rare earth material, since such materials have especially strong magnetic fields. The extremely high coercive field strength of polarization of such materials make demagnetization by opposing fields practically impossible. Thus permanent magnets of an alloy of the composition $SmCo_5$ have a very high energy product $BH > 150$ $kJ/m^3$, a high remanence induction $B_r > 0.85$ T, and a high coercitive field strength $_JH_c > 15000$ A/cm.

The magnetic field in the discharge chamber can advantageously be further increased by means for concentrating the magnetic flux in the discharge chamber. Thus there may be advantageously be provided at the ring magnet on the cathode side a pole ring which concentrates the magnetic flux toward the discharge chamber. Further, a pole ring may advantageously also be provided on the side of the ring magnet away from the cathode side. It is particularly favorable for the magnetic field pattern if the central openings of the pole rings become narrower with increasing distance from the ring magnet. Pole rings thus formed concentrate and stabilize the magnetic field in the discharge chamber and at the same time bring it as close as possible to the disk surface. The distance between the pole ring at anodic potential on the cathode side and the anode-side surface of the disk at cathodic potential should be as small as possible. The optimum distance, to avoid frequent shorts, is about 0.1 to 0.3 mm.

To avoid distortions and field strength variations of the magnetic field due to electrically conductive disks of different size of ferromagnetic material consisting of or containing the substance to be analyzed, an annular shield plate of soft magnetic material may further, preferably, be arranged between the anode body or the ring magnet and the disk. This shield plate may be at cathodic potential or at anodic potential, depending on whether it is separated by an insulation from the anode body or from the disk.

The magnetic field produced by the permanent magnet is changed by the temperature occurring in the discharge chamber. The temperature influence on the magnetic field is expressed by the reversible temperature coefficient of the remanence, which for $SmCo_5$ between 25° and 250° C. is about $-0.05\%$ /K. To stabilize of the magnetic field against temperature changes, the anode body containing the ring magnet may advantageously be adapted to be cooled by liquid. It is especially favorable if the anode body consists of a good heat conductor material and contains at least one cooling channel surrounding the ring magnet. The temperature stability of the magnetic field can be further improved by separating the ring magnet from the discharge chamber by a protective tube of good heat conductor material.

DETAILED DESCRIPTION OF THE PREFERRED EMBODIMENT

Figure 1:
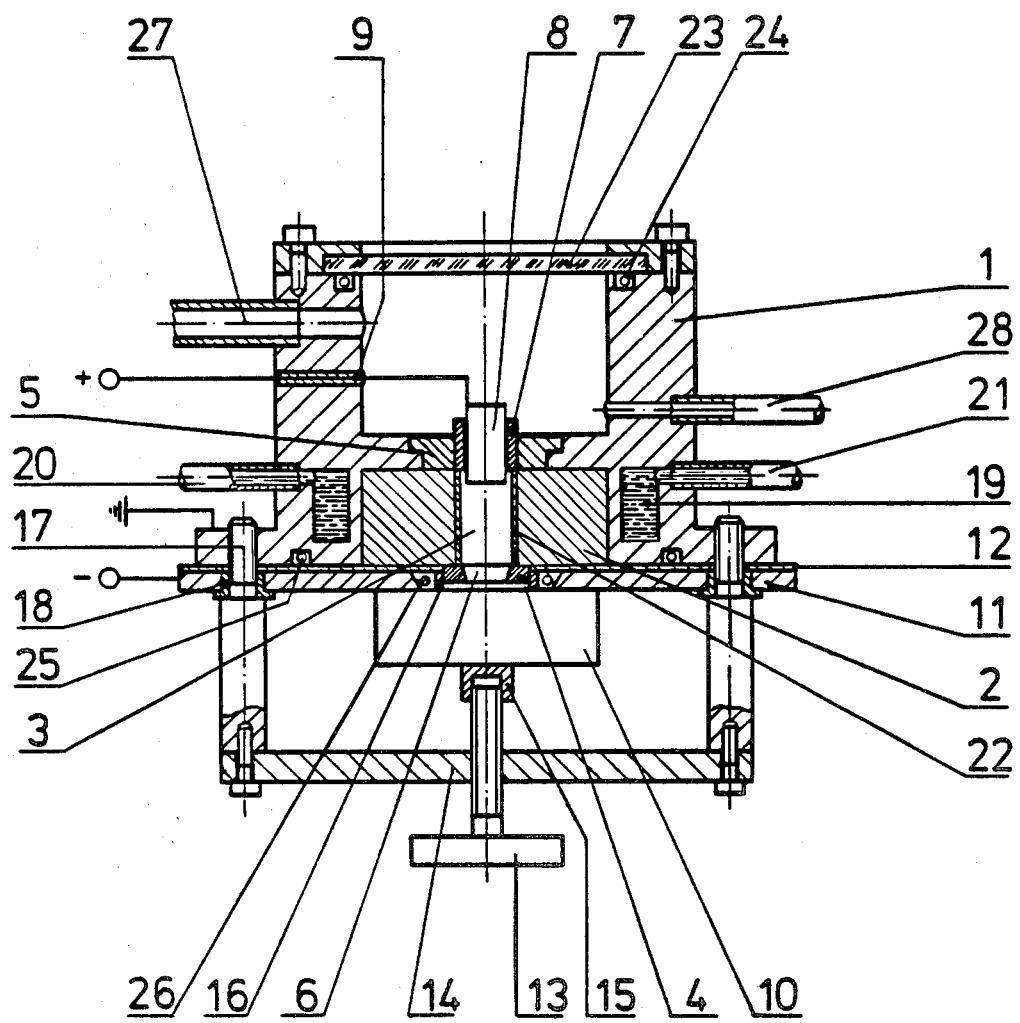
FIG. 1 is a schematic cross section of one form of construction of the glow discharge lamp according to the present invention with a ring magnetic of permanent material.

In the form of construction of the glow discharge lamp according to the present invention illustrated in FIG. 1, a ring magnet 2 magnetized in the axial direction is fitted into an anode body 1 with a circular base consisting of a good heat conducting material, e.g., conductive bronze or a copper-beryllium alloy. The ring magnet will preferably consist of an $SmCo_5$ alloy, be about 15 mm thick, and have an outside diameter of 40 mm and an inside diameter of 10 mm. In the discharge chamber 3, the magnetic field produced by the ring magnet 2 extends substantially parallel to the center axis thereof. For the further concentration of the magnetic flux in the discharge chamber 3, two pole rings 4 and 5 are disposed respectively on the cathode side and on the side of the ring magnet 2 away from the cathode side. The central opening 6 of the pole ring 4 become narrower with increasing distance from the ring magnet 2 and therefore brings about a particularly strong concentration of the magnetic field in the discharge chamber 3, more particularly near the cathode region thereof. Into the pole ring 5 is fitted an insulating sleeve 7, for instance, of polytetrafluroethylene. In it is disposed, coaxial with the discharge chamber 3, a control electrode 8, approximately 10 mm long, the outside diameter of which is about 7 mm, and the inside diameter about 6 mm. Highly heat-conductive materials such as copper alloys, for instance, high-conduction bronze or brass are particularly suited as materials for the control electrode 8. However, ferromagnetic materials can also be used which then provide for an even more advantageous shape of the magnetic field in the discharge chamber 3. The control electrode 8 is connectd via a vacuum-tight feedthrough 9 which is insulated from the anode body 1, to a variable d-c voltage source which allows, for instance, output voltages between 0 and 150 V at a maximum d-c current of about 0.3 A. The current can be controlled by the control electrode in such a manner that a constant preselected discharge current flows through the glow discharge lamp, independently of the devications due to the different specimens. However, it is also possible to start out from the light intensity of the discharge and to control the intensity to a constant value by opto-electronic means.

Between an electrically conductive disk 10 consisting for example of the substance to be analyzed and is at cathode potential and the ring magnet 2 or the anode body 1, there is further provided an annular shield plate 11 of soft magnetic material, which prevents passage of the lines of flux externally surrounding the ring magnet 2 into the disk 10 and hence field distortions due to different sizes or positions of the disk 10. As material for the pole rings 4 and 5 and for the shield plate 11, soft magnetic alloys of high saturation are preferably used, e.g., a cobalt-iron alloy containing about 49% by weight cobalt, a 2% by weight vanadium, the balance iron, having a saturation induction of about 2.35 T.

The shield plate 11 is separated from the ring magnet 2 and from the anode body 1 by an annular insulating disk 12, for example 0.1 mm thick, and is at cathode potential. By means of a pressing screw 13 which is guided in a mount 14 and insulated from disk 10 by an insulating cap 15, disk 8 is pressed against an annular insulating piece 16, which is arranged at the ring magnet 2 on the cathode side and may be for example 2 mm thick. The insulating disk 12, insulating piece 16 and insulating cap 15 may consist, for example, of polytetrafluoroethylene. The anode body 1 and shield plate 11 are held together by two screw sholders 17 which are present at the ends of the lateral beams of mount 14 and are insulated from the shield plate 11 by insulating sleeves 18.

To remove the heat caused by the discharge, in particular to keep the ring magnet 2 at constant temperature, a cooling channel 19 surrounding the ring magnet 2 is provided in the anode body 1. It can be produced for example by cutting an annular groove into the anode body 1 from the cathode side and then closing the groove, for example, by soldering. Pipe connection 20 lets the cooling water in and pipe connection 21 lets it out. Also, for heat removal, a protective tube 22, e.g., of copper with a wall thickness of 0.5 mm, which separates the ring magnet 2 from the discharge chamber is used.

The spectrometer side of the anode body 1 is closed off by a transparent window 23, e.g., of surface ground quartz glass. O rings 24, 25 and 26 provide a vacuum proof seal of the interior of the glow discharge lamp. For the operation of the glow discharge lamp the working gas, preferably highest purity argon, is continuously let in through the gas inlet connection 27. The working gas pressure is adjusted by continual pumping off through the pump connection 28, the working gas being supplied to the actual discharge chamber 3 through the opening away from the cathode side and being removed again through the same opening. Sample changing can be carried out simply and very quickly with the aid of the screw 13. At each sample change it is expedient to clean the inner edge of the pole ring 4 mechanically, e.g., by means of a brass wire brush, and apply dry compressed air. More thorough cleaning can also be carried out quickly and easily by removal of the pole ring 4 and extraction of the protective tube 22, without having to take off the glow discharge lamp.

Figure 2:
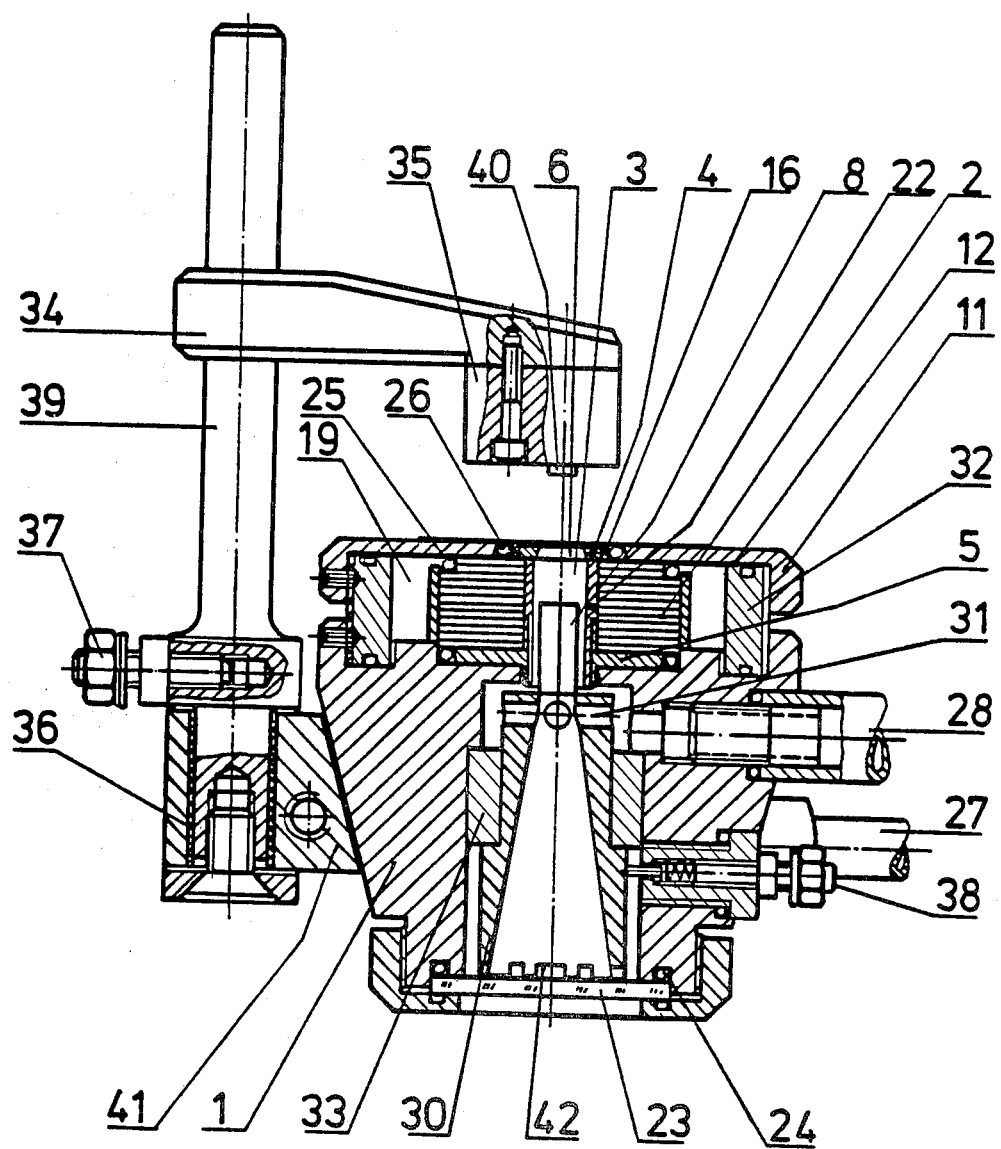
FIG. 2 is a similar view of another form of construction of the glow discharge lamp according to the present invention.

The embodiment of the glow discharge lamp according to the present invention shown in FIG. 2 differs from the embodiment according to FIG. 1 essentially in that the control electrode 8 is fastened on the spectrometer side to a tubular insert 30, which is arranged inside the anode body 1 and is insulated from the latter by an insulating ring 33. The spacing between the control electrode and the part at anode potential surrounding the latter is at least large enough that no electric breakdown can take place in operation. This arrangement prevents, in particular, vapor deposition on the insulating sleeve 7 shown in FIG. 1 and thereby the danger of possible short circuits due to vapor deposition.

The working gas is admitted through the connection 27 and flows through the annular space between the anode body 1 and the insert 30 and the cutouts 42 into the insert 30 and from there, as a counter-flow, through the control electrode 8 into the discharge chamber 3. The working gas is drawn off again via the tubular connection 28, partly through the ring shaped space between the control electrode 8 and protective tube 22 and partly through the holes 31 in the tubular wall of the insert 30. The holes insure that the working gas can be suctioned off without turbulence and without danger of excessive convection at the part of the control electrode 8 on the spectrometer side.

A specimen holder 34 insures that the electrically conducting disc 10 which is not shown here and consists, for instance, of the substance to be analyzed, and serves as the specimen body 11, is firmly pressed against the shield plate 11. A commercially available head part 35 which contains a contact plunger 40 which can be operated by compressed air is screwed to the specimen holder 34. The speciman holder 34 is movable along a guide bar 39 which is mounted, insulated by an insulating sleeve 36, in a mount 41. The mount 41 is fastened to the anode body 1, for instance, by soldering. On the cathode side, the glow discharge lamp according to the present invention can be connected via the terminal 37 to the negative pole of d-c voltage source, the positive pole of which is, like the anode body, at ground potential. By means of a vacuum tight, electrically insulated feed-through 38, the control electrode can be connected to a commercially available variable d-c voltage source which can be set, for instance, to output voltages between 0 and 150 V and is designed for a maximum d-c current of 0.3 A.

The remaining parts of the glow discharge lamp according to FIG. 2 corresponds substantially to the parts designated with the same reference numerals of FIG. 1. However, the cooling canal 19 surrounds the ring magnet 2 directly. The cooling canal 19 and the ring magnet 2 are insulated from the shield plate 11, which is at cathode potential during the operation of the glow discharge lamp, by the insulating washer 12 and the insulating ring 32.

The glow discharge lamp according to FIG. 1 was used in a 1.5 m grating spectrometer with a spectral range 200 to 450 nm. Discs 10 of the substance to be analyzed were used as measurement samples. To eliminate surface contamination and to adjust the temperature equilibrium of the specimens at cathode potential, a burn-in operation was first performed for each measurement for 10 sec with a d-c voltage of 1,000 V and subsequently for 90 sec with a voltage of 800 V. The diameter of the focus spot limited by the opening 6 of the pole ring 4 was approximately 7 mm. The measurements were made always toward the end of the burn-in period at a cathode voltage of 800 V and a control voltage, the value of which could be controlled between 0 and about 150 V. Since the resulting current and thereby, the amount of material removed and also the degree of excitation depends on the sample material, the measurement was continued until the integrated charge had reached a preselected value. The measuring time itself was in the order of bout 20 sec.

Figure 3:
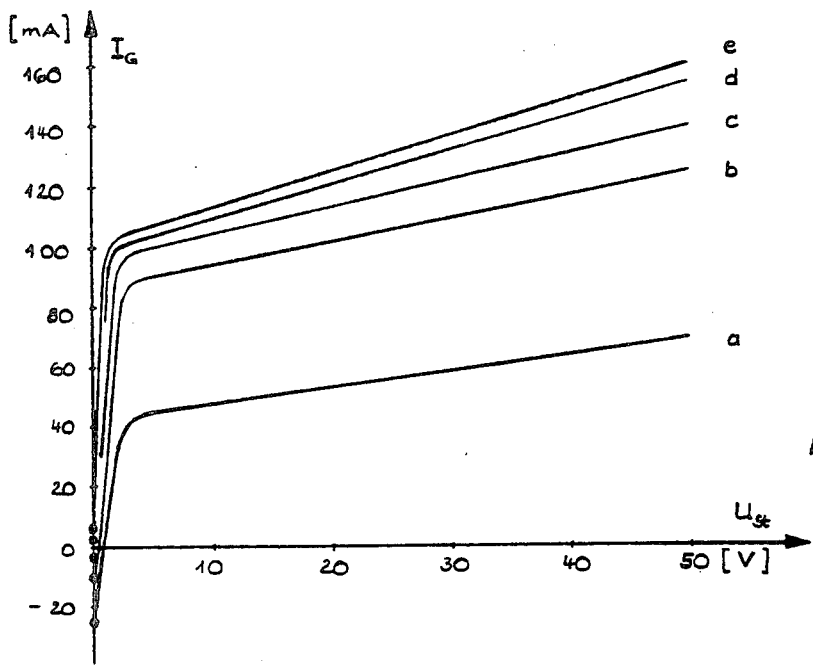
FIG. 3 are curves showing the discharge current when using a copper-nickel sample as a function of the control voltage for different distances of the control electrode from the cathode surface in a glow discharge lamp according to FIG. 1.

With a glow discharge lamp according to FIG. 1, the discharge current was measured, using a CuNi44 sample, as a function of the control voltage with the distance of the control electrode from the cathode surface, i.e. the surface of the disc 10 on the anode side, as a parameter. In the measurements, the disc 10 at cathode potential consisted of the CuNi44 sample. The working gas pressure, with argon as the working gas, was constant at 250 Pa and the cathode accelerating voltage was fixed at 800 V. The distance of the control electrode 8 from the cathode surface was changed and, more specifically, for several values from 1 to 10 mm. The result is shown in FIG. 3. On the abscissa is plotted the control voltage $U_{St}$ in V, and the discharge current $I_G$ in mA is plotted on the ordinate. The curves a to e show the measured values for an electrode spacing of 1 mm (curve a), 3.5 mm (b), 5 mm (c), 8 mm (d) and 10 mm (e). As will be seen, the occurring discharge current without applied control voltage (ordinate values indicated by dots) are due solely to the space charge. At an electrode spacing of about 8 mm, the space charge changes from the negative to the positive region. With an electrode spacing of about 10 mm, almost the entire column of the gas discharge plasma is spatially between the control electrode and the cathode so that it is engaged by the field of the control electrode practically in its entirety when a potential is applied to the control electrode. This condition is partically favorable for the high intensity of excitation. In addition, the optical aperature angle is reduced with this spacing and, at the same time, the danger of vapor deposition on the electrode by sputtered specimen material is eliminated. From about 5 V of control voltage onward, the discharge current rises in all curves linearly with further increase of the control voltage.

Figure 4:
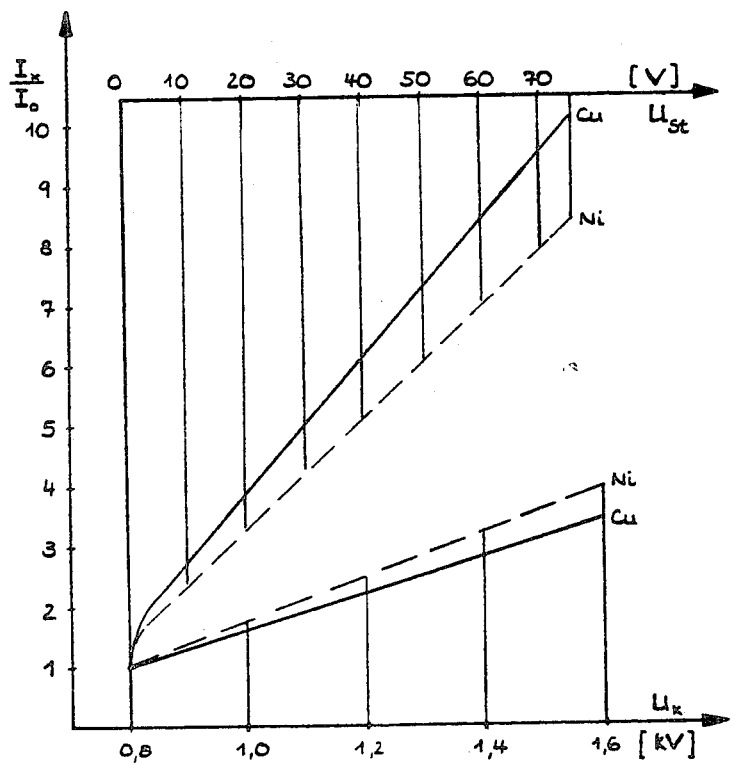
FIG. 4 is a pair of curves showing the dependence of the amplification factor of the intensity of the copper and nickel line on the cathode voltage (lower curves) and as a function of the control voltage for a constant cathode voltage of 0.8 kV (upper curves) in a glow discharge lamp accoring to FIG. 1.

In FIG. 4 the dependence of the amplification factor of the intensity $I_x/I_o$ of the copper line 324.8 nm) and of the nickel line (349.9 nm) of a CuNi44 sample on the cathode voltage (lower curves) and on the control voltage $U_{St}$ for constant cathode voltage $U_K=0.8$ kV (upper curves) is shown. On the lower abscissa axis, the cathode voltage is plotted in kV, on the upper abscissa axis the control voltage in V, and on the ordinate axis the relative intensity. As the curves show, the amplfication factor changes considerably more if the control voltage is increased than in dependence on the cathode voltage. The glow discharge lamp operated with a control voltage at approximately 75 V thus permits a very high light intensity with relatively little electric power. While the intensity of the copper resonance line, with a constant cathode voltage of 0.8 kV, a working pressure of the argon of 250 Pa and a control voltage of +5 V relative to the anode is amplified by the factor 2, the intensity amplification of the coper line reaches even 10 times that value at +75 V. Without control voltage, the discharge current at a cathode voltage of 0.8 kV is 60 mA. With a control voltage of +5 V, the discharge current increases to 70 mA and with a control voltage of +75 V even to 130 mA. This increase of the current is accompanied by increased material removal of the sample (disc 10) through cathode sputtering. Enrichment of the gas discharge plasma with sample material, however, means an amplification of the intensity of the spectral lines and, therefore, greater reliability of the analysis.

The glow discharge lamp according to the present invention can be modified still further over the embodiments shown in FIGS. 1 and 2. Thus, the shield plate 11 can also adjoin the anode body 1 and the ring magnet 2 directly, for instance. It must then be separated from the disc 10 by insulating material since it is at anode potential. In this embodiment no part of the glow discharge lamp at anode potential then still extends into a space which is surrounded on the outside by a part at cathode potential. The disc 10 can then be connected, in the embodiment of FIG. 1, to the cathode potential via the contact pressure screw 13 and the mount 14. The insulating cap 15 must then be omitted, of course, and the threaded extensions 17 must also be insulated from the anode part 1, for instance, by insulating sleeves.

Further, a controllable electromagnet can additionally be provided, advantageously coaxially to the ring magnet of permanent magnet material, as has already been proposed for a glow discharge lamp without control electrodes; the controllable magnetic field of the electromagnet is superimposd on the magnetic field of the permanent magnet.

It is particularly advantageous for the cooperation between the permanent magnet and the electromagnet if the ring magnet and the electromagnet are arranged one behind the other in the axial direction within the anode body. In particular, more favorable conditions regarding the leakage of the magnetic field are obtained than with an electromagnet which surrounds the permanent on the outside.

The electrically conducting disc 10 may consist, as in the known glow discharge lamps, entirely or partly of the substance to be analyzed, have a surface layer of this substance, be impregnated with the substance or contain samples of the substance in wire form in corresponding holes. In the last-mentioned cases, as well as in the analysis of gaseous substances which are mixed to the working gas, a disc material will preferably be used which itself does not evaporate particularly easily and interferes with the analysis as little as possible.

What is claimed is:

1. In a glow discharge lamp for qualitative and quantitative spectrum analysis having an anode body and a cathode and a discharge chamber closeable by an electrically conducting disc at cathode potential, the improvement comprising:
   (a) means for producing a magnetic field extending essentially in the axial direction in the discharge chamber; and
   (b) a control electrode disposed in said chamber insulated from the anode body, said control electrode generating an additional electric field which, in cooperation with said magnetic field, results in an increased number of collisions of electrons and atoms and increased material decomposition of the substance to be analyzed to provide an increased intensity of cathode glow and permitting operation at lower pressures.

2. The improvement according to claim 1, wherein said control electrode is adapted to have a potential which is positive relative to the anode applied thereto.

3. The improvement according to claim 2, wherein said control electrode is disposed coaxially in the part of the discharge chamber on the anode side.

4. The improvement according to claim 3, wherein said control electrode is fastened to a insulated tubular insert on the anode side within the anode body.

5. The improvement according to claim 4, wherein said insert consists of a highly heat-conducting material having at least one hole in its tube wall.

6. The improvement according to claim 5, wherein said tubular insert has an opening with an inside diameter which becomes larger with increasing distance from the control electrode.

7. The improvement according to claim 1, wherein the anode body contains a ring magnet of permanent magnet material surrounding the discharge chamber and magnetized in the axial direction.

8. The improvement according to claim 7, wherein said ring magnet consists of cobalt-rare earth magnetic material.

9. The improvement according to claim 7 and further including means for concentrating the magnetic flux in the discharge chamber.

10. The improvement according to claim 9, wherein said means for concentrating comprises a pole ring at the ring magnet on the cathode side.

11. The improvement according to claim 10 and further including a further pole ring on the side of the ring magnet away from the cathode side.

12. The improvement according to claim 10, wherein the central opening of said pole ring becomes narrower with increasing distance from the ring magnet.

13. The improvement according to claim 7 and further including an annular shield plate of soft magnetic material disposed between said anode body or said ring magnet and said disk.

14. The improvement according to claim 7, wherein said anode body is adapted to be cooled means of a liquid.

15. The improvement according to claim 14, wherein said anode body consists of a good heat conductor material and contains at least one cooling channel surrounding said ring magnet.

16. The improvement according to claim 15, wherein said ring magnet is separated from the discharge chamber by a protective tube of good heat conductor material.

* * * * *